United States Patent [19]

Ledebuhr

[11] Patent Number: 5,111,315

[45] Date of Patent: May 5, 1992

[54] OPTICAL SYSTEM FOR ILLUMINATING A LIGHT VALVE

[75] Inventor: Arno G. Ledebuhr, Pleasanton, Calif.

[73] Assignee: Hughes Aircraft Company, Los Angeles, Calif.

[21] Appl. No.: 658,139

[22] Filed: Feb. 14, 1991

[51] Int. Cl.$^5$ .................. G02F 1/133; G03B 21/14; G02B 27/28

[52] U.S. Cl. ...................... 359/40; 359/64; 359/496; 353/20; 353/122

[58] Field of Search ............ 359/40, 64, 496, 634, 359/638; 353/20, 33, 81, 122

[56] References Cited

U.S. PATENT DOCUMENTS

| | | | |
|---|---|---|---|
| 4,425,028 | 1/1984 | Gagnon et al. | 359/40 |
| 4,715,684 | 12/1987 | Gagnon | 359/40 |
| 4,824,214 | 4/1989 | Ledebuhr | 359/40 |
| 4,842,374 | 6/1989 | Ledebuhr | 359/40 |
| 4,913,529 | 4/1990 | Goldenberg et al. | 359/496 |
| 4,989,076 | 1/1991 | Owada et al. | 359/40 |

*Primary Examiner*—John S. Heyman
*Assistant Examiner*—Anita Pellman Gross
*Attorney, Agent, or Firm*—Wanda K. Denson-Low

[57] ABSTRACT

A color sequential illumination system (10) for a single light valve full-color projector is disclosed herein. The inventive color sequential system (10) is operative to illuminate a light valve (28) in response to an input beam. A prepolarizer arrangement (11, 13) polarizes optical energy of a first band of wavelengths within the input beam in a first state, and polarizes optical energy of a second band of wavelengths within the input beam in a second state. The system (10) includes a first liquid crystal switch (14), in optical alignment with the prepolarizer arrangement (11, 13), for selectively rotating the polarization states of optical energy within the first and second wavelength bands. A polarizer filter (18, 20), in optical alignment with the first liquid crystal switch (14), filters optical energy within the second wavelength band polarized in the predetermined state. A second liquid crystal switch (16), in optical alignment with the polarizer filter (18 20), selectively rotates the polarization states of optical energy within the first and second wavelength bands. The inventive system (10) also includes a broadband polarizer (24), in optical alignment with the second liquid crystal switch (16), for directing optical energy polarized in a predetermined state to the light valve (28).

9 Claims, 5 Drawing Sheets

FIG. 7

OPTICAL SYSTEM FOR ILLUMINATING A LIGHT VALVE

BACKGROUND OF THE INVENTION

1. Field of the Invention

The present invention relates to light valve image projection systems. More specifically, the present invention relates to techniques for illuminating multicolor light valve image projectors.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Much progress in the state of the art of high quality large screen projectors can be attributed to the development of the liquid crystal light valve. The reflective mode liquid crystal light valve is a thin film, multilayer structure comprising a liquid crystal layer, a dielectric mirror, a light blocking layer, and a photoresponsive layer. The multi-layer structure is sandwiched between two transparent electrodes. A polarized projection beam is directed through the liquid crystal layer to the dielectric mirror. An input image of low intensity light, such as that generated by a cathode ray tube, is applied to the photoresponsive layer. Application of low intensity light to the photoresponsive layer induces a spatial variation in the voltage drop across the photoresponsive layer in the pattern of the input image. The spatial variation in voltage drop across the photoresponsive layer is mirrored in reverse within the liquid crystal given the series relationship existing between the two layers. Linearly polarized projection light passing through the liquid crystal layer and reflecting from the dielectric mirrors is polarization-modulated in accordance with the input image impressed on the photoconductor and mirrored in the liquid crystal layer. Accordingly, the light valve is operative to create a replica of an image focused onto the photoconductive layer which can be projected with magnification to produce a high brightness image on a viewing screen. U.S. Pat. No. 4,019,807 issued to D. D. Boswell et al discloses such a high-performance reflective mode liquid crystal light valve.

A graphics display projector using a liquid crystal light valve of the above type is described in an article entitled "Application of the Liquid Crystal Light Valve to a Large Screen Graphics Display", published in the 1979 *Society for Information Display* (SID), International Symposium, Digest of Technical Papers, May 1979, pp. 22-23. More sophisticated liquid crystal light valve image projection systems are illustrated in the following U.S. Pat. Nos. 4,425,028, issued to R. J. Gagnon et al on Jan. 10, 1984; 4,544,237, issued to R. J. Gagnon on Oct. 1, 1985; 4,461,542 to R. J. Gagnon on July 24, 1984; and 4,464,019, issued to R. J. Gagnon on Aug. 7, 1984.

In many conventional liquid crystal light valve image projection systems, three primary color images (red, green and blue) are displayed in optical registration on a viewing screen. The three primary color images are typically generated by three separate light valves, which are projected on the screen by three separate projection lenses. The projection lenses are arranged about an optical axis which passes through the composite image displayed on the screen. In such an arrangement of projection lenses it is necessary that the three primary color images converge in the plane occupied by the screen. In order to effect such convergence, complicated and expensive optical arrangements with accompanying electronics are typically required.

In other light valve color projection systems the red, green and blue primary color images are generated by separate portions of a single light valve. However, in such single light valve systems each primary color image does not utilize the full resolution of the entire light valve. Accordingly, the full-color image projected by the single light valve may be of less than desired resolution.

As is well known, certain color projection systems utilize cathode ray tubes, rather than light valves, in order to generate the individual primary color images. In color projection systems having only a single cathode ray tube, the red, green, and blue primary color images may be generated by positioning a rotating filter wheel over the face of the cathode ray tube (CRT). For example, in certain early color televisions the filter wheel is oriented such that individual primary color images are sequentially projected to create a composite full-color projected image. Since the entire face of the CRT is employed in generating each sequential primary color image, the resolution of the composite image is higher than in systems wherein portions of a CRT are dedicated to continuously generating a single primary color image.

However, mechanical arrangements or other techniques for sequentially generating primary color images in single light valve projection systems are not heretofore known to exist. Moreover, high speed mechanical parts are typically sensitive to vibration and often require periodic adjustment. Accordingly, high speed parts such as filter wheels are disfavored for use in projection systems operative in rugged environments or in systems designed to require minimal maintenance.

Thus, a need in the art exists for a single light valve full-color projection system operative to generate a sequence of primary color images without the aid of high speed mechanical parts.

SUMMARY OF THE INVENTION

The need in the art for a single light valve full-color projector is addressed by the color sequential illumination system of the present invention. The inventive color sequential system is operative to illuminate a light valve in response to an input beam. A prepolarizer arrangement polarizes optical energy of a first band of wavelengths within said input beam in a first state and polarizes optical energy of a second band of wavelengths within said input beam in a second state. The system includes a first liquid crystal switch, in optical alignment with the prepolarizer arrangement, for selectively rotating the polarization states of optical energy within the first and second wavelength bands. A polarizer filter, in optical alignment with the first liquid crystal switch, filters optical energy within the second wavelength band polarized in the predetermined state. A second liquid crystal switch, in optical alignment with the polarizer filter, selectively rotates the polarization states of optical energy within the first and second wavelength bands. The inventive system also includes a broadband polarizer, in optical alignment with the second liquid crystal switch, for directing optical energy polarized in a predetermined state to the light valve.

DETAILED DESCRIPTION OF THE INVENTION

The present invention provides a simple, easily aligned alternative to conventional full color liquid crystal light valve image projection systems. The illumination system of the present invention operates with no moving parts, and provides for the illumination of a light valve with a beam which sequentially changes in color. The switch rate of the illuminating beam is such that the individual color images appear to fuse together and the viewer sees a composite full color image.

Figures 1A, 1B:
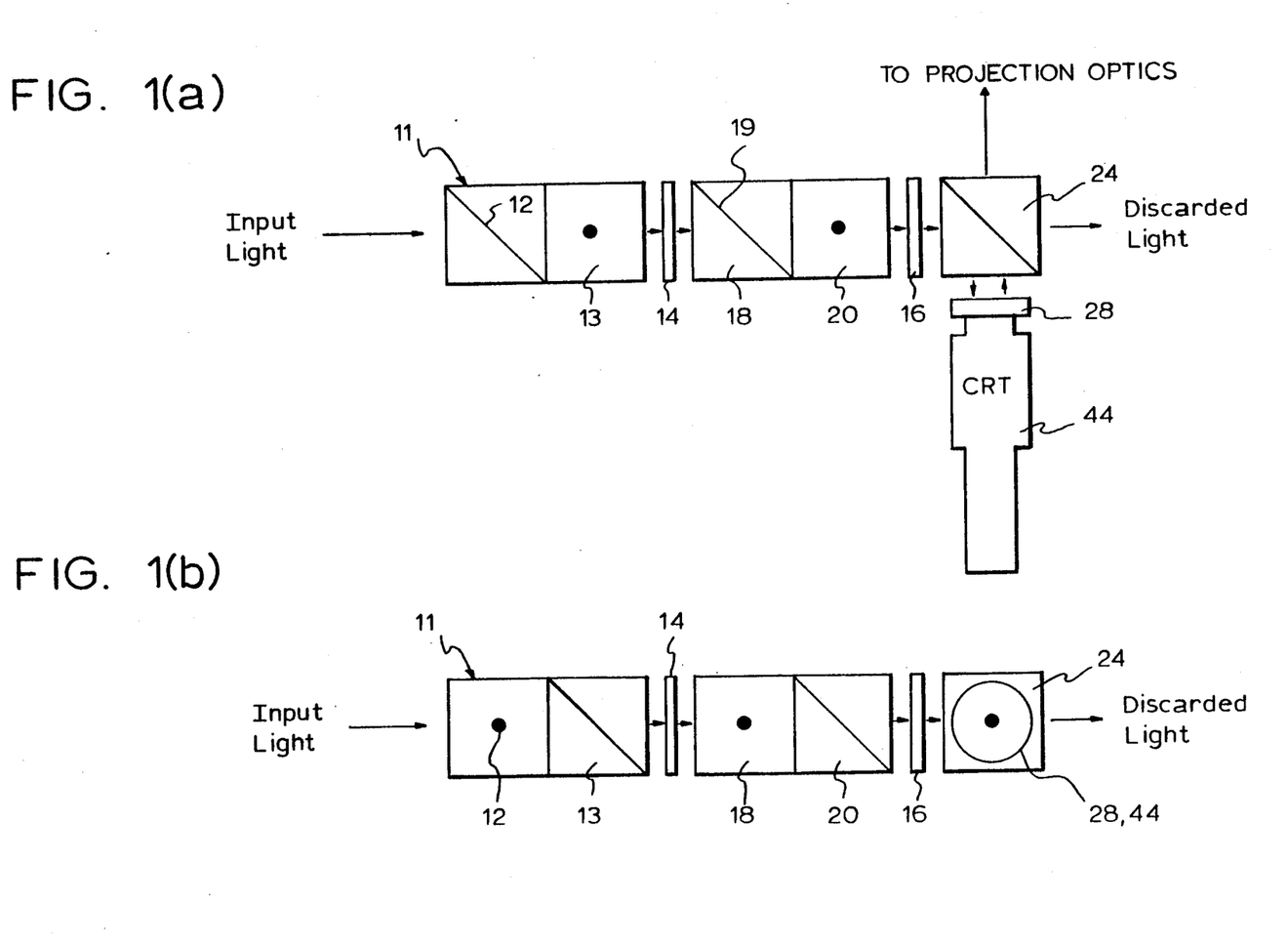
FIG. 1a shows an illustrative top view of an illumination system of the present invention.
FIG. 1b shows an illustrative side view of an illumination system of the present invention.

FIGS. 1a and 1b show an illustrative top view, and an illustrative side view, respectively, of the illumination system 10 of the present invention. Input illumination provided by a laser source (not shown), having S and P polarization states, is prepolarized by a conventional MacNeille green polarizing prism 11 having a first filter element 12. The first filter element 12 is oriented at an angle of 45 degrees (although larger angles may be used) relative to the input illumination so as to pass P polarized green wavelengths while reflecting S polarized green light 90 degrees away from the optical path of the incident illumination. Assuming this orientation of the prepolarizer 11, the prepolarizer 13 would be arranged to pass P polarized red and blue wavelengths, and to remove S polarized red and blue wavelengths.

Figure 2A:
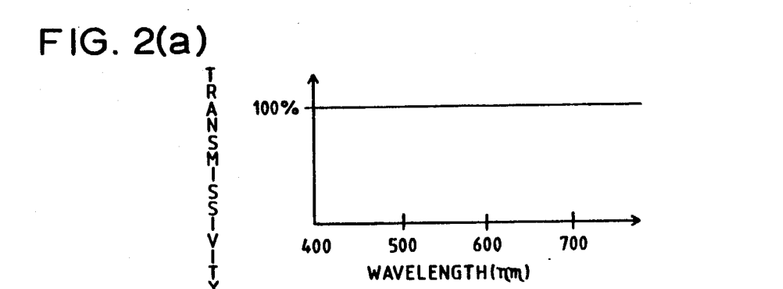
FIG. 2a depicts the transmissivity of the green polarizing prism of the illustrative embodiment of the illumination system of the present invention with respect to incident P polarized optical energy.
Figure 2B:
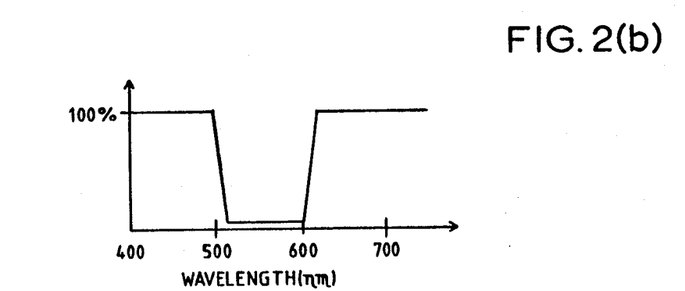
FIG. 2b depicts the transmissivity of the green polarizing prism of the illustrative embodiment of the illumination system of the present invention with respect to incident S polarized optical energy.
Figure 3A:
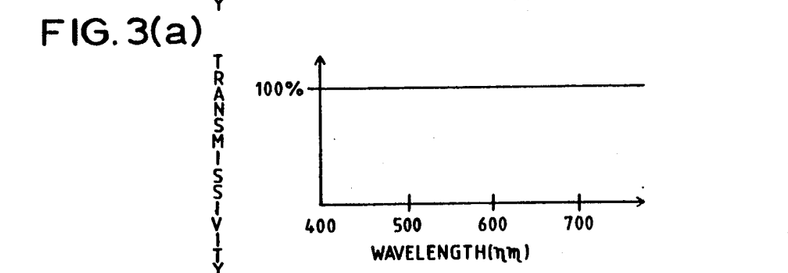
FIG. 3a shows the transmissivity of the red and blue prepolarizing prism of the illustrative embodiment of the illumination system of the present invention to incident P polarized optical energy.
Figure 3B:
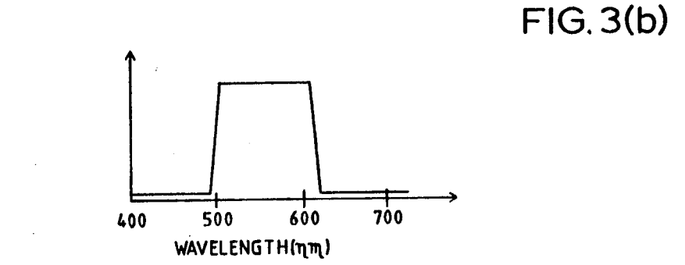
FIG. 3b shows the transmissivity of the red and blue prepolarizing prism of the illustrative embodiment of the illumination system of the present invention to incident S polarized optical energy.

FIGS. 2a and 2b depict the appropriate transmissivity of the green polarizing prism 11 with respect to incident P polarized and S polarized optical energy, respectively. Similarly, FIGS. 3a and 3b show the desired transmissivity of the prepolarizing prism 13 to incident P polarized and S polarized optical energy, respectively.

Hence, the green polarizing prism 11 is oriented to pass green optical wavelengths of a first polarization state to a red and blue prepolarizing prism 13. The prism 13 passes red and blue optical wavelengths of a second orthogonal polarization state along with green wavelengths polarized in the first state to a first liquid crystal switch 14.

The first liquid crystal switch 14, when in the OFF state, acts as a half-wave retarder with respect to light passed by the green prism 11. In particular, when in the OFF state, the switch 14 rotates the polarization of the green light incident thereon from the first to the second polarization state, and rotates the polarization of the incident red and blue light to the first polarization state. When ON, the switch 14 does not affect the polarization of optical energy passing therethrough. The switch 14 and a second liquid crystal switch 16 (discussed below) may be realized by liquid crystal picells or by shutters manufactured by the Tektronix Corporation. Control of the switches 14 and 16 by a programmable controller is discussed below.

The polarized red, green and blue light transmitted by the first liquid crystal switch 14 is incident on a conventional MacNeille red polarizer filter 18 having a second filter element 19. The second filter element 19 is oriented at 45 degrees with respect to the incident optical train so as to reflect red optical wavelengths of the second polarization state away from the path of the incident optical train. Accordingly, only when the first liquid crystal switch 14 is in the OFF state will any red wavelengths be permitted to pass through the red filter 18 to a blue polarizer filter 20. (The blue filter 20 may be realized by a conventional MacNeille polarizer filter.) When the switch 14 is ON the optical energy incident on the blue filter 20 will consist of green light of the first polarization state and blue light of the second polarization state. When the switch 14 is OFF, green light of the second polarization state and red and blue light of the first polarization state impinge on the blue filter 20.

Figure 4A:
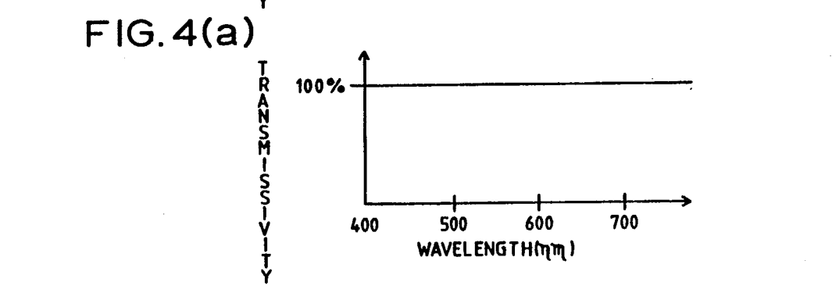
FIG. 4a shows the optical transmissivity of the red filter of the illustrative embodiment of the illumination system of the present invention to incident P polarized light.
Figure 4B:
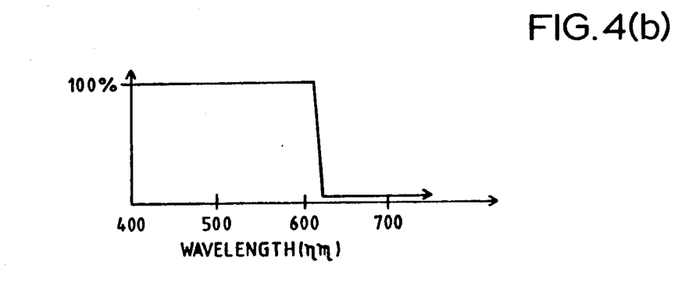
FIG. 4b shows the optical transmissivity of the red filter of the illustrative embodiment of the illumination system of the present invention to incident S polarized light.

The desired optical transmissivity of the red filter 18 to P polarized and S polarized light is shown in FIGS. 4a and 4b, respectively, and is based on the utilization of polarizing filters having the profiles of FIGS. 2a, 2b, 3a and 3b.

Figure 5A:
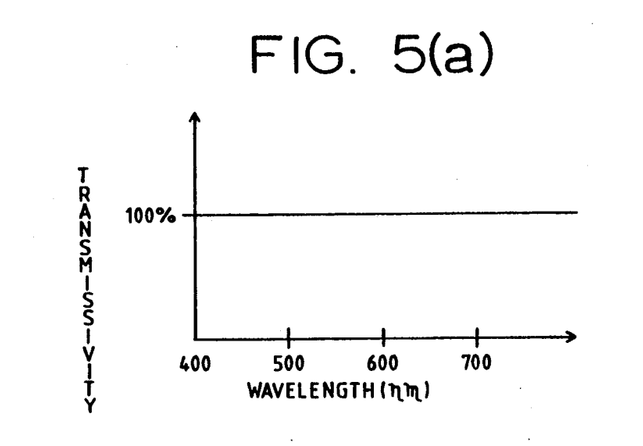
FIG. 5a shows the optical transmissivity of the blue filter of the illustrative embodiment of the illumination system of the present invention to incident P polarized light.
Figure 5B:
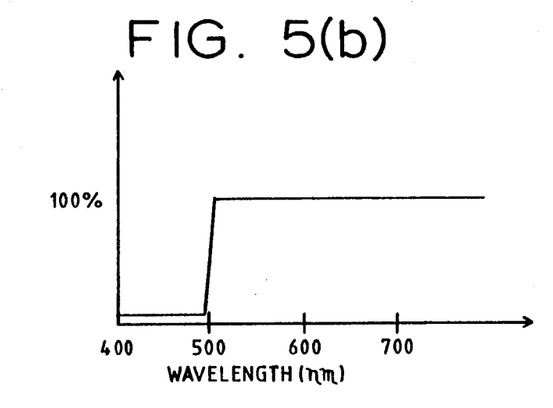
FIG. 5b shows the optical transmissivity of the blue filter of the illustrative embodiment of the illumination system of the present invention to incident S polarized light.

The blue filter 20 is positioned with respect to the incident optical train so as to reflect blue wavelengths of the first polarization state away therefrom. The appropriate transmissivity characteristics of the blue filter 20 to incident P polarized and S polarized optical energy are shown in FIGS. 5a and 5b, respectively. When the switch 14 is ON the blue filter 20 will pass green light of the first polarization state and blue light of the second polarization state to the second switch 16. When the switch 14 is OFF, green light of the second polarization state and red light of the first polarization state are transmitted to the second switch 16 by the blue filter 20.

Figure 6A:
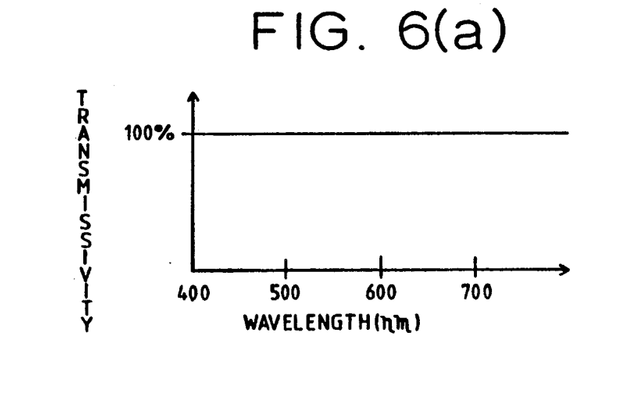
FIG. 6a depicts the transmissivity profile of the broadband polarizer of the illustrative embodiment of the illumination system of the present invention relative to incident P polarized optical energy.
Figure 6B:
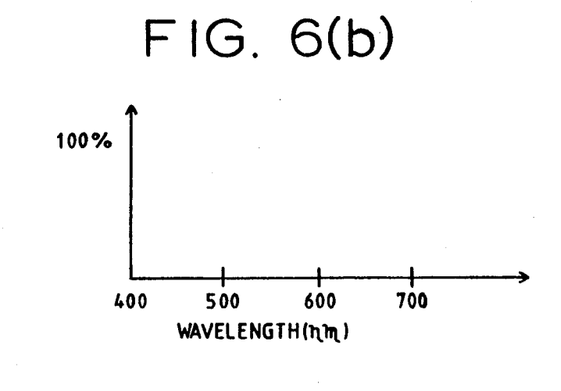
FIG. 6b depicts the transmissivity profile of the broadband polarizer of the illustrative embodiment of the illumination system of the present invention relative to incident S polarized optical energy.

When OFF, the second switch 16 is operative to rotate the polarization of the light passed by the blue filter 20 by ninety degrees. Optical energy propagating through the switch 16 is incident on a MacNeille type broadband polarizer 24, which reflects red, green and blue optical wavelengths of the second polarization state to an optical light valve 28. The transmissivity profiles of the polarizer 24 relative to incident P polarized and S polarized optical energy are given by FIGS. 6a and 6b, respectively. As is discussed below, the switches 14 and 16 may be rapidly turned OFF and ON in order to sequentially illuminate the light valve 28 with red, green and blue optical energy.

Figure 7:
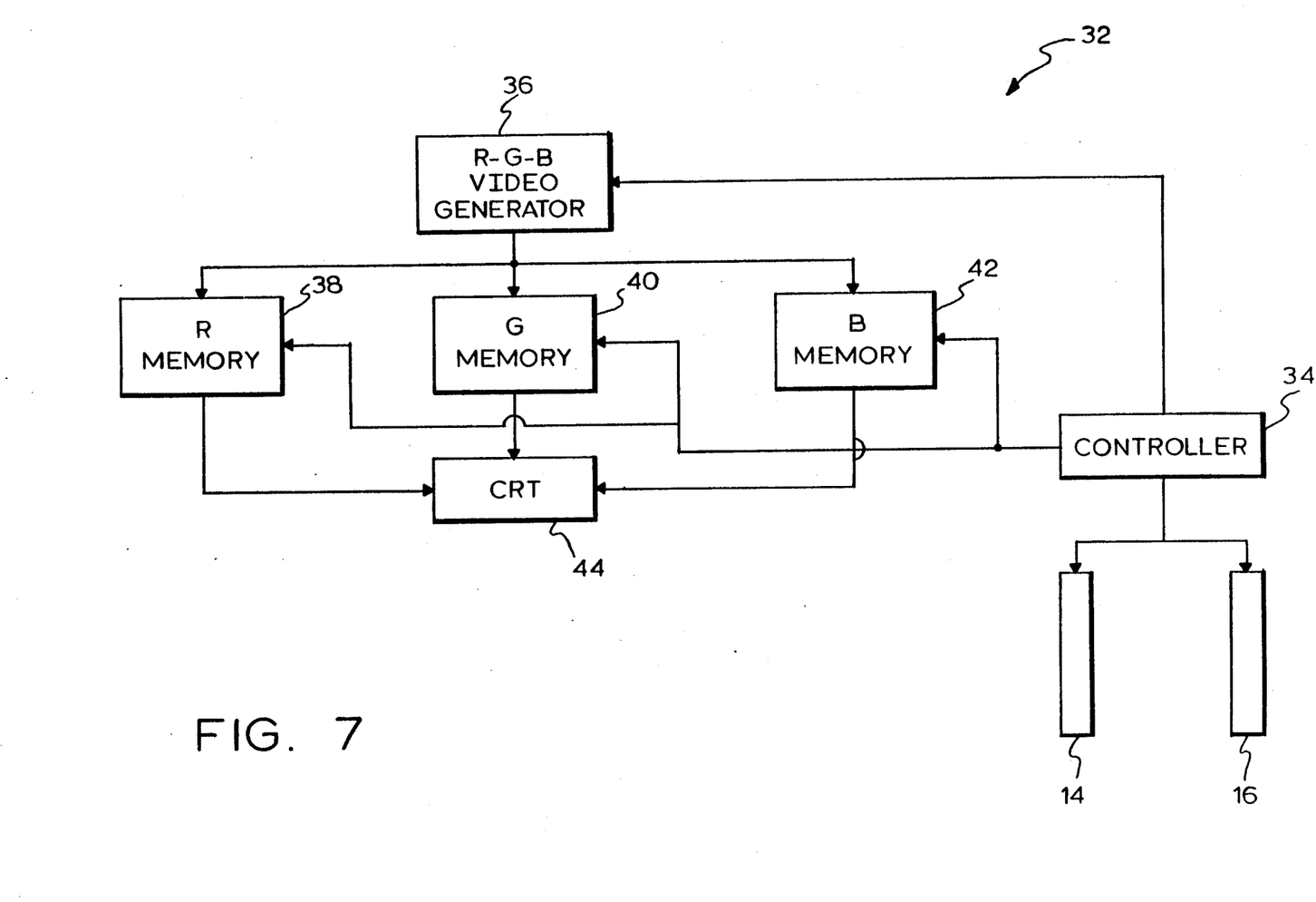
FIG. 7 is a block diagrammatic representation of the switch control system employed within the present invention.

As shown in the block diagram of FIG. 7, the switches 14 and 16 are periodically switched by a control system 32. The controller 34, which in the illustrative embodiment includes a suitably programmed microprocessor, triggers a standard RGB video generator 36 to dump the red video signals into a first memory 38, the green video into a second memory 40, and the blue video into a third memory 42. Ordinarily, these signals would be provided directly to a cathode ray tube (CRT) 44 for display. In accordance with the teachings of the present invention, the video stored in each memory is sequentially applied to the CRT by the controller 34. Simultaneously, the controller 34 adjusts the state (ON or OFF) of the switches 14 and 16 such that the color of the optical energy impinging on the light valve 28 corresponds to the "color" of the video information being applied to the CRT 44. For example, the system 32 is operative to place switches 14 and 16 in the OFF state in order to channel red optical wavelengths to the light valve 28 while red video signals are driving the CRT 44.

Figure 8A:
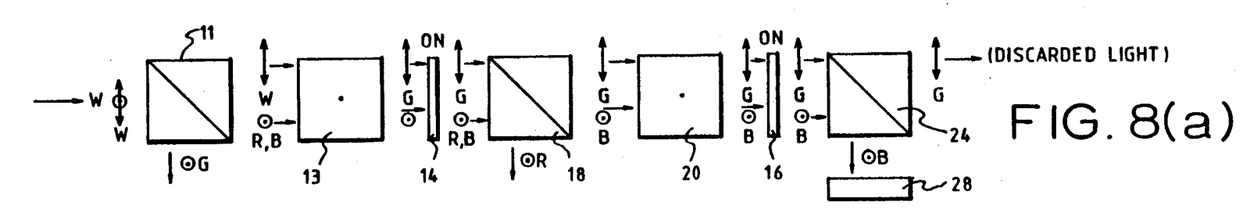
FIG. 8a depicts the manner in which the states of the first and second liquid crystal switches are adjusted such that blue optical energy is directed to the surface of the light valve.
Figure 8B:
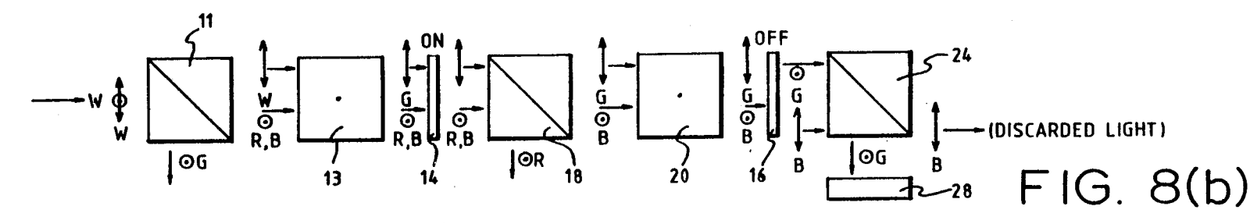
FIGS. 8b and 8c depict manners in which the states of the first and second liquid crystal switches may be adjusted such that green optical energy is directed to the surface of the light valve.
Figure 8C:
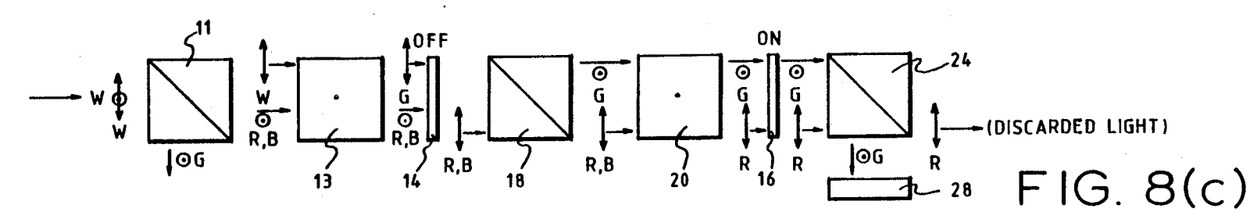
Figure 8D:
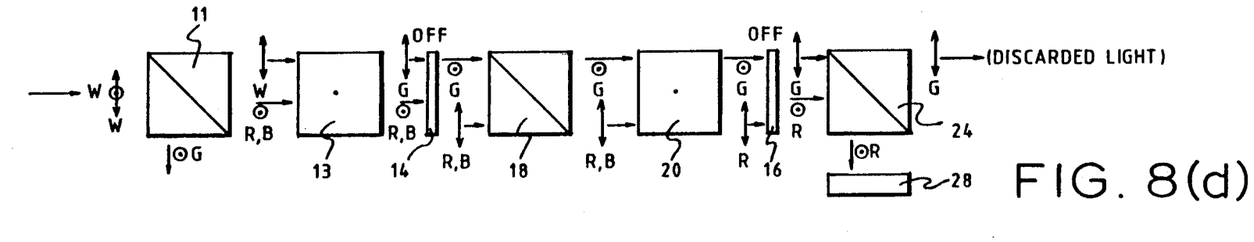
FIG. 8d depicts the manner in which the states of the first and second liquid crystal switches are adjusted such that red optical energy is directed to the surface of the light valve.

FIGS. 8a, 8b, 8c, and 8d depict the manner in which the states of the switches 14 and 16 are adjusted such that either red, green or blue optical energy is directed to the surface of the light valve 28. For example, in FIG. 8a blue light is provided to the light valve 28 by placing switches 14 and 16 in the ON state. FIGS. 8b and 8c indicate that green light is directed to the light valve 28 by maintaining switch 14 and switch 16 in opposite states. Specifically, in FIG. 8b switch 14 is ON and switch 16 is OFF, while in FIG. 8c switch 14 is OFF and switch 16 is ON. FIG. 8d shows that red light illuminates the light valve 28 when both switches 14 and 16 are placed in the OFF state.

Returning to FIG. 1a, optical energy of the second polarization state incident on the broadband polarizer 24 is reflected to the light valve 28. When, for example, red light of the second polarization state impinges on the light valve 28, the CRT 44 is contemporaneously supplied with red video information from memory 38. The presence of video on the CRT screen triggers the light valve 28 to reflect the incident red light as red light of the first polarization state toward the broadband polarizer 24. This reflected red light passes through the broadband polarizer 24 to projection optics and display surface (not shown). The respective states of the switches 14 and 16 are sequentially changed sufficiently rapidly that the displayed red, green and blue colors appear to a viewer to fuse together. Accordingly, the viewer sees a composite full color image. For example, if a 30 Hz frame rate is required for a full color image, the required frame rate for each successive primary color is 90 Hz. With the time for each complete frame being 33 msec., the time available for each primary colored frame is approximately 11 msec. with a wait of 22 msec. before the same color is displayed. If an interlaced display is required then the scan rate for each primary colored field is 180 Hz and display time is 5.5 msec. per field. These display times are only approximate, since the vertical retrace time must be subtracted from the available time to display the video information.

Thus the present invention has been described with reference to a particular embodiment in connection with a particular application. Those having ordinary skill in the art and access to the teachings of the present invention will recognize additional modifications and applications within the scope thereof. For example, the present invention is not limited to a system employing three primary colors. Image projection systems utilizing other numbers of primary colors to engender a multi-color composite image may fall within the scope of the present invention. The invention is similarly not limited to any particular means for prepolarizing the input optical energy. Moreover, while an exemplary control system is disclosed herein it is understood that other control systems may be employed as is known in the art. In addition, the invention is not limited to use with liquid crystal light valves. The teachings provided herein may be used in any application where a benefit may be derived by sequential application of electromagnetic beams to a surface.

It is therefore contemplated by the appended claims to cover any and all such modifications.

Accordingly,

What is claimed is:

1. An optical system for illuminating a light valve in response to an optical input beam, comprising:
   prepolarizer means for polarizing optical energy of a first band of wavelengths within said input beam in a first state and for polarizing optical energy of a second band of wavelengths within said input beam in a second state;
   first liquid crystal switch means, in optical alignment with said prepolarizer means, for selectively rotating the polarization states of optical energy within said first and second wavelength bands;
   polarizer filter means, in optical alignment with said first liquid crystal switch means, for filtering optical energy within said second wavelength band polarized in a predetermined state;

second liquid crystal switch means, in optical alignment with said polarizer filter means, for selectively rotating the polarization states of optical energy within said first and second wavelength bands; and broadband polarizer means, in optical alignment with said second liquid crystal switch means, for directing optical energy polarized in a predetermined state to said light valve.

2. The system of claim 1 wherein said prepolarizer means includes a first prepolarizer for polarizing optical energy within said first wavelength band and a second prepolarizer for polarizing optical energy within said second wavelength band.

3. The system of claim 1 wherein said polarizer filter means includes a polarizer for separating from said input beam optical energy within said second wavelength band having said predetermined polarization.

4. An optical system for illuminating a light valve in response to an optical input beam, comprising:

prepolarizer means for polarizing optical energy of a first band of wavelengths within said input beam in a first state and for polarizing optical energy of a second band of wavelengths within said input beam in a second state;

first liquid crystal switch means, in optical alignment with said prepolarizer means, for selectively rotating the polarization states of optical energy within said first and second wavelength bands;

polarizer filter means, in optical alignment with said first liquid crystal switch means, for filtering optical energy within said second wavelength band polarized in said second state;

second liquid crystal switch means, in optical alignment with said polarizer filter means, for selectively rotating the polarization states of optical energy within said first and second wavelength bands; and broadband polarizer means, in optical alignment with said second liquid crystal switch means, for directing optical energy polarized in said second state to said light valve.

5. An optical system for illuminating a light valve in response to an optical input beam, comprising:

prepolarizer means for polarizing first, second and third bands of wavelengths within said input beam in predetermined states;

first liquid crystal switch means, in optical alignment with said prepolarizer means, for selectively rotating the polarization of optical energy within said first, second and third bands passing therethrough;

polarizer filter means, in optical alignment with said first liquid crystal switch means, for filtering optical energy within said second and third wavelength bands polarized in predetermined states;

second liquid crystal switch means, in optical alignment with said polarizer filter means, for selectively rotating the polarization states of optical energy within said first, second and third wavelength bands passing therethrough; and broadband polarizer means, in optical alignment with said second liquid crystal switch means, for directing optical energy polarized in a predetermined state to said light valve.

6. An optical system for illuminating a light valve in response to an optical input beam, comprising:

prepolarizer means for polarizing a first band of wavelengths within said input beam in a first state, and for polarizing second and third bands of wavelengths within said input beam in a second state orthogonal to said first state;

first liquid crystal switch means, in optical alignment with said prepolarizer means, for selectively rotating the polarization of optical energy within said first wavelength band to said second state, and for selectively rotating the polarization of optical energy within said second and third bands to said first state;

polarizer filter means, in optical alignment with said first liquid crystal switch means, for filtering optical energy within said second and third wavelength bands polarized in predetermined states;

second liquid crystal switch means, in optical alignment with said polarizer filter means, for selectively rotating the polarization states of optical energy within said first, second and third wavelength bands passing therethrough; and broadband polarizer means, in optical alignment with said second liquid crystal switch means, for directing to said light valve optical energy polarized in a predetermined state.

7. An optical system for illuminating a light valve in response to an optical input beam, comprising:

prepolarizer means for polarizing a green band of wavelengths within said input beam in a first state, and for polarizing red and blue bands of wavelengths within said input beam in a second state orthogonal to said first state;

first liquid crystal switch means, in optical alignment with said prepolarizer means, for selectively rotating the polarization of optical energy within said green wavelength band to said second state, and for selectively rotating the polarization of optical energy within said red and blue bands to said first state;

a red polarizer filter, in optical alignment with said first liquid crystal switch means, for filtering optical energy within said red wavelength band polarized in said second state;

a blue polarizer filter, in optical alignment with said first liquid crystal switch means, for filtering optical energy within said blue wavelength band polarized in said first state;

second liquid crystal switch means, in optical alignment with said polarizer filter means, for selectively rotating the polarization states of optical energy within said red, green and blue first, second and third wavelength bands; and broadband polarizer means, in optical alignment with said second liquid crystal switch means, for directing to said light valve optical energy polarized in a predetermined state.

8. An optical system for illuminating a liquid crystal light valve in response to an optical input beam, comprising:

prepolarizer means for polarizing a green band of wavelengths within said input beam in a first state, and for polarizing red and blue bands of wavelengths within said input beam in a second state orthogonal to said first state;

first liquid crystal switch means, in optical alignment with said prepolarizer means, for selectively rotating the polarization of optical energy within said green wavelength band to said second state, and for selectively rotating the polarization of optical energy within said red and blue bands to said first state;
a red polarizer filter, in optical alignment with said first liquid crystal switch means, for filtering optical energy within said red wavelength band polarized in said second state;
a blue polarizer filter, in optical alignment with said first liquid crystal switch means, for filtering optical energy within said blue wavelength band polarized in said first state;
second liquid crystal switch means, in optical alignment with said polarizer filter means, for selectively rotating the polarization states of optical energy within said red, green and blue first, second and third wavelength bands;
broadband polarizer means, in optical alignment with said second liquid crystal switch means, for directing to said light valve optical energy polarized in a predetermined state; and
controller means for sequentially actuating said first and second liquid crystal switch means.

9. A method for illuminating a light valve by utilizing an optical input beam, comprising the steps of:
a) polarizing optical energy of a first band of wavelengths within said input beam in a first state, and polarizing optical energy of a second band of wavelengths within said input beam in a second state;
b) selectively rotating the polarization states of optical energy within said beam having said first and second wavelength bands;
c) filtering from said beam optical energy within said second wavelength band polarized in a predetermined state;
d) selectively rotating the polarization states of optical energy within said filtered beam included within said first and second wavelength bands; and
e) directing optical energy from said filtered beam polarized in a predetermined state to said light valve.

* * * * *